(12) United States Patent
Von Braun

(10) Patent No.: US 12,262,138 B2
(45) Date of Patent: Mar. 25, 2025

(54) METHOD AND SYSTEM FOR CAPTURING IMAGES

(71) Applicant: H2VR Hold Co, Inc., Covina, CA (US)

(72) Inventor: Max Von Braun, Weilheim (DE)

(73) Assignee: H2VR HoldCo, Inc., Covina, CA (US)

( * ) Notice: Subject to any disclaimer, the term of this patent is extended or adjusted under 35 U.S.C. 154(b) by 0 days.

(21) Appl. No.: 18/254,800

(22) PCT Filed: Nov. 29, 2021

(86) PCT No.: PCT/EP2021/083432
§ 371 (c)(1),
(2) Date: May 26, 2023

(87) PCT Pub. No.: WO2022/112579
PCT Pub. Date: Jun. 2, 2022

(65) Prior Publication Data
US 2024/0305738 A1 Sep. 12, 2024

(30) Foreign Application Priority Data

Nov. 29, 2020 (EP) .................................... 20210504
Apr. 19, 2021 (EP) .................................... 21169258

(51) Int. Cl.
*H04N 5/222* (2006.01)
*H04N 5/272* (2006.01)
*H04N 23/63* (2023.01)

(52) U.S. Cl.
CPC .......... *H04N 5/2224* (2013.01); *H04N 5/272* (2013.01); *H04N 23/635* (2023.01)

(58) Field of Classification Search
CPC ..... H04N 5/2224; H04N 5/272; H04N 23/635
See application file for complete search history.

(56) References Cited

U.S. PATENT DOCUMENTS 5,841,771 A * 11/1998 Irwin ................. H04Q 11/0478
370/383
6,357,028 B1 * 3/2002 Zhu .................... H04N 21/6377
714/751
(Continued)

FOREIGN PATENT DOCUMENTS

EP         2309307 A1    4/2011
EP         2309307 B1 * 12/2020 ............. A61B 3/113
(Continued)

OTHER PUBLICATIONS

JP 2009224832 A (Year: 2009).*
(Continued)

*Primary Examiner* — Michael B. Pierorazio
(74) *Attorney, Agent, or Firm* — Downs Rachlin Martin PLLC

(57) ABSTRACT

The present disclosure concerns a method for producing images or a video of a scenery. The method includes the steps of providing a digital camera configured to capture images of said scenery, and arranging one or more active displays within or adjacent to said scenery, said one or more active displays being configured to show image data at a high display frame rate (HDFR). The method further includes the steps of presenting at least a first set of image data and a second set of image data on said active display in a time-sliced multiplexed manner, wherein at least said second set of image data comprises chromakey image data and/or tracking pattern image data, and capturing images of said scenery with said digital camera, with said capturing of images of said digital camera being synchronized with the presentation of image data on said active display.

20 Claims, 4 Drawing Sheets

(56) References Cited

U.S. PATENT DOCUMENTS

| | | | | |
|---|---|---|---|---|
| 6,396,850 | B1* | 5/2002 | de Vito | H04N 7/1675 |
| | | | | 348/E7.056 |
| 6,665,345 | B1* | 12/2003 | Sekiguchi | H04N 19/66 |
| | | | | 375/E7.279 |
| 6,980,731 | B1* | 12/2005 | Tahara | H04N 21/43632 |
| | | | | 386/E9.036 |
| 6,983,323 | B2 | 1/2006 | Cantrell | H04L 69/22 |
| | | | | 709/225 |
| 7,617,509 | B1* | 11/2009 | Brunheroto | H04N 17/004 |
| | | | | 725/19 |
| 7,760,826 | B2* | 7/2010 | Chang | H04L 25/03019 |
| | | | | 375/346 |
| 8,279,884 | B1* | 10/2012 | Narasimha | H04L 47/365 |
| | | | | 370/410 |
| 8,284,259 | B2* | 10/2012 | Karacali-Akyamac | |
| | | | | H04L 43/024 |
| | | | | 348/180 |
| 8,620,275 | B2* | 12/2013 | Minear | H04N 21/812 |
| | | | | 725/62 |
| 9,203,498 | B2* | 12/2015 | Ohayon | H04L 69/324 |
| 10,735,120 | B1* | 8/2020 | Kantharaju | H04L 43/087 |
| 2002/0053053 | A1* | 5/2002 | Nagai | H04L 1/205 |
| | | | | 375/E7.016 |
| 2002/0196363 | A1* | 12/2002 | Furusawa | H04N 21/4344 |
| | | | | 348/461 |
| 2003/0051254 | A1* | 3/2003 | Weidenfeller | H04L 65/613 |
| | | | | 725/98 |
| 2004/0105463 | A1* | 6/2004 | Cheung | H04L 1/0001 |
| | | | | 370/468 |
| 2004/0153940 | A1* | 8/2004 | Yu | H03M 13/2957 |
| | | | | 714/746 |
| 2005/0100100 | A1* | 5/2005 | Unger | H04N 21/6373 |
| | | | | 375/E7.134 |
| 2005/0120124 | A1* | 6/2005 | Korhonen | H04L 1/18 |
| | | | | 714/746 |
| 2005/0180415 | A1* | 8/2005 | Cheung | H04N 21/6437 |
| | | | | 348/E7.071 |
| 2005/0262529 | A1* | 11/2005 | Neogi | H04N 21/63345 |
| | | | | 725/31 |
| 2007/0053303 | A1* | 3/2007 | Kryuchkov | H04L 43/0852 |
| | | | | 370/252 |
| 2008/0075031 | A1* | 3/2008 | Ohayon | H04N 21/6143 |
| | | | | 370/316 |
| 2008/0170630 | A1* | 7/2008 | Falik | H04L 47/26 |
| | | | | 375/E7.193 |
| 2008/0192119 | A1* | 8/2008 | Li | H04N 21/44209 |
| | | | | 348/180 |
| 2008/0259962 | A1* | 10/2008 | Mori | H04N 21/4305 |
| | | | | 375/E7.278 |
| 2009/0158326 | A1* | 6/2009 | Hunt | H04N 5/783 |
| | | | | 725/38 |
| 2009/0276821 | A1* | 11/2009 | Amento | H04N 21/44226 |
| | | | | 725/116 |
| 2010/0080305 | A1* | 4/2010 | Guo | H04N 21/4382 |
| | | | | 375/E7.279 |
| 2010/0091888 | A1* | 4/2010 | Nemiroff | H04N 19/115 |
| | | | | 375/E7.154 |
| 2011/0222669 | A1* | 9/2011 | Buriano | H04L 65/752 |
| | | | | 379/32.01 |
| 2012/0042091 | A1* | 2/2012 | McCarthy | H04N 21/812 |
| | | | | 709/231 |
| 2012/0116758 | A1* | 5/2012 | Murgia | G10L 19/24 |
| | | | | 704/226 |
| 2013/0028121 | A1* | 1/2013 | Rajapakse | H04N 21/40 |
| | | | | 370/252 |
| 2013/0044803 | A1* | 2/2013 | Fisher | H04N 21/8455 |
| | | | | 709/231 |
| 2013/0089140 | A1* | 4/2013 | Kudana | H04N 19/152 |
| | | | | 375/240.03 |
| 2013/0340023 | A1* | 12/2013 | Yoshimoto | H04N 21/6375 |
| | | | | 725/116 |
| 2014/0013342 | A1* | 1/2014 | Swan | H04N 21/4821 |
| | | | | 725/92 |
| 2014/0233587 | A1* | 8/2014 | Liu | H04L 47/782 |
| | | | | 370/468 |
| 2015/0082366 | A1* | 3/2015 | French | H04N 21/6371 |
| | | | | 725/116 |
| 2015/0189394 | A1* | 7/2015 | French | H04L 65/611 |
| | | | | 725/109 |
| 2016/0165266 | A1* | 6/2016 | Bocharnikov | H04N 21/242 |
| | | | | 725/109 |
| 2016/0261896 | A1* | 9/2016 | Bocharnikov | H04N 21/23424 |
| 2016/0295254 | A1* | 10/2016 | Chen | H04N 21/23406 |
| 2017/0111686 | A1* | 4/2017 | Quere | H04N 21/8547 |
| 2017/0302378 | A1* | 10/2017 | Mutalik | H04L 12/2856 |
| 2018/0295050 | A1* | 10/2018 | Lee | H04L 43/04 |
| 2019/0014050 | A1* | 1/2019 | Wang | H04L 49/9005 |
| 2019/0116057 | A1* | 4/2019 | Colson | H04L 12/2801 |
| 2019/0207690 | A1* | 7/2019 | Mäki | H04Q 11/00 |
| 2019/0327499 | A1* | 10/2019 | Poli | H04N 21/2353 |
| 2022/0053491 | A1* | 2/2022 | Sevindik | H04W 72/0453 |

FOREIGN PATENT DOCUMENTS

| | | |
|---|---|---|
| JP | 2009-224832 A2 | 10/2009 |
| JP | 2009224832 A * | 10/2009 |
| WO | 2018138366 A1 | 8/2018 |

OTHER PUBLICATIONS

International Search Report and Written Opinion in corresponding International Application No. PCT/EP2021/083432, dated Jul. 20, 2022, 23 pages.

* cited by examiner

*a) slots 1-3*

1 (VF)

| 1 | 32 | 7 | 96 | 243 |
|---|---|---|---|---|
| 153 | 138 | 135 | 136 | 164 |
| 248 | 2 | 159 | 77 | 79 |
| 167 | 181 | 133 | 175 | 52 |
| 117 | 68 | 75 | 130 | 157 |
| 18 | 212 | 229 | 193 | 7 |
| 160 | 147 | 201 | 201 | 182 |
| 162 | 168 | 6 | 19 | 77 |
| 168 | 208 | 9 | 1 | 12 |
| 142 | 116 | 147 | 73 | 219 |
| 131 | 160 | 211 | 73 | 198 |

2 (VF)

| 1 | 32 | 7 | 96 | 243 |
|---|---|---|---|---|
| 153 | 138 | 135 | 136 | 164 |
| 248 | 2 | 159 | 77 | 79 |
| 167 | 181 | 133 | 175 | 52 |
| 117 | 68 | 75 | 130 | 157 |
| 18 | 212 | 229 | 193 | 7 |
| 160 | 147 | 201 | 201 | 182 |
| 162 | 168 | 6 | 19 | 77 |
| 168 | 208 | 9 | 1 | 12 |
| 142 | 116 | 147 | 73 | 219 |
| 131 | 160 | 211 | 73 | 198 |

3 (T)

| 190 | 190 | 190 | 190 | 190 |
|---|---|---|---|---|
| 190 | 190 | 190 | 190 | 190 |
| 190 | 190 | 190 | 190 | 190 |
| 190 | 128 | 190 | 128 | 190 |
| 190 | 128 | 190 | 128 | 190 |
| 128 | 128 | 128 | 128 | 128 |
| 190 | 128 | 190 | 128 | 190 |
| 190 | 128 | 190 | 128 | 190 |
| 190 | 190 | 190 | 190 | 190 |
| 190 | 190 | 190 | 190 | 190 |
| 190 | 190 | 190 | 190 | 190 |

*b) slots 4-6*

4 (IT)

| 65 | 65 | 65 | 65 | 65 |
|---|---|---|---|---|
| 65 | 65 | 65 | 65 | 65 |
| 65 | 65 | 65 | 65 | 65 |
| 65 | 127 | 65 | 127 | 65 |
| 65 | 127 | 65 | 127 | 65 |
| 127 | 127 | 127 | 127 | 127 |
| 65 | 127 | 65 | 127 | 65 |
| 65 | 127 | 65 | 127 | 65 |
| 65 | 65 | 65 | 65 | 65 |
| 65 | 65 | 65 | 65 | 65 |
| 65 | 65 | 65 | 65 | 65 |

5 (VF)

| 1 | 32 | 7 | 96 | 243 |
|---|---|---|---|---|
| 153 | 138 | 135 | 136 | 164 |
| 248 | 2 | 159 | 77 | 79 |
| 167 | 181 | 133 | 175 | 52 |
| 117 | 68 | 75 | 130 | 157 |
| 18 | 212 | 229 | 193 | 7 |
| 160 | 147 | 201 | 201 | 182 |
| 162 | 168 | 6 | 19 | 77 |
| 168 | 208 | 9 | 1 | 12 |
| 142 | 116 | 147 | 73 | 219 |
| 131 | 160 | 211 | 73 | 198 |

6 (VF)

| 1 | 32 | 7 | 96 | 243 |
|---|---|---|---|---|
| 153 | 138 | 135 | 136 | 164 |
| 248 | 2 | 159 | 77 | 79 |
| 167 | 181 | 133 | 175 | 52 |
| 117 | 68 | 75 | 130 | 157 |
| 18 | 212 | 229 | 193 | 7 |
| 160 | 147 | 201 | 201 | 182 |
| 162 | 168 | 6 | 19 | 77 |
| 168 | 208 | 9 | 1 | 12 |
| 142 | 116 | 147 | 73 | 219 |
| 131 | 160 | 211 | 73 | 198 |

*c)*

C1 = (VF+VF+T)/3

| 64 | 85 | 68 | 127 | 225 |
|---|---|---|---|---|
| 165 | 155 | 153 | 154 | 173 |
| 229 | 65 | 169 | 115 | 116 |
| 175 | 163 | 152 | 159 | 98 |
| 141 | 88 | 113 | 129 | 168 |
| 55 | 184 | 195 | 171 | 47 |
| 170 | 141 | 197 | 177 | 185 |
| 171 | 155 | 67 | 55 | 115 |
| 175 | 202 | 69 | 64 | 71 |
| 158 | 141 | 161 | 112 | 209 |
| 151 | 170 | 204 | 112 | 195 |

C2 = (IT+VF+VF)/3

| 22 | 43 | 26 | 86 | 184 |
|---|---|---|---|---|
| 124 | 114 | 112 | 112 | 131 |
| 187 | 23 | 128 | 73 | 74 |
| 133 | 163 | 110 | 159 | 56 |
| 100 | 88 | 72 | 129 | 126 |
| 54 | 184 | 195 | 171 | 47 |
| 128 | 140 | 156 | 176 | 143 |
| 130 | 154 | 26 | 55 | 73 |
| 134 | 160 | 28 | 22 | 30 |
| 116 | 99 | 120 | 70 | 168 |
| 109 | 128 | 162 | 70 | 154 |

S1 = |C1 - C2|

| 41 | 42 | 42 | 42 | 42 |
|---|---|---|---|---|
| 41 | 42 | 42 | 42 | 41 |
| 42 | 42 | 41 | 42 | 42 |
| 42 | 0 | 41 | 0 | 42 |
| 42 | 1 | 42 | 0 | 41 |
| 0 | 0 | 1 | 0 | 1 |
| 42 | 0 | 42 | 1 | 42 |
| 41 | 0 | 42 | 1 | 41 |
| 42 | 42 | 42 | 42 | 42 |
| 42 | 41 | 42 | 41 | 42 |
| 42 | 41 | 42 | 42 | 42 |

*d)*

C1' = (VF+VF+T)

| 192 | 254 | 204 | 382 | 676 |
|---|---|---|---|---|
| 496 | 466 | 460 | 462 | 518 |
| 686 | 194 | 508 | 344 | 348 |
| 524 | 490 | 456 | 478 | 294 |
| 424 | 264 | 340 | 388 | 504 |
| 164 | 552 | 586 | 514 | 142 |
| 510 | 422 | 592 | 530 | 554 |
| 514 | 464 | 202 | 166 | 344 |
| 526 | 606 | 208 | 192 | 214 |
| 474 | 422 | 484 | 336 | 628 |
| 452 | 510 | 612 | 336 | 586 |

C2' = (IT+VF+VF)

| 67 | 129 | 79 | 257 | 551 |
|---|---|---|---|---|
| 371 | 341 | 335 | 337 | 393 |
| 561 | 69 | 383 | 219 | 223 |
| 399 | 489 | 331 | 477 | 169 |
| 299 | 263 | 215 | 387 | 379 |
| 163 | 551 | 585 | 513 | 141 |
| 385 | 421 | 467 | 529 | 429 |
| 389 | 463 | 77 | 165 | 219 |
| 401 | 481 | 83 | 67 | 89 |
| 349 | 297 | 359 | 211 | 503 |
| 327 | 385 | 487 | 211 | 461 |

S1' = |C1' - C2'|

| 125 | 125 | 125 | 125 | 125 |
|---|---|---|---|---|
| 125 | 125 | 125 | 125 | 125 |
| 125 | 125 | 125 | 125 | 125 |
| 125 | 1 | 125 | 1 | 125 |
| 125 | 1 | 125 | 1 | 125 |
| 1 | 1 | 1 | 1 | 1 |
| 125 | 1 | 125 | 1 | 125 |
| 125 | 1 | 125 | 1 | 125 |
| 125 | 125 | 125 | 125 | 125 |
| 125 | 125 | 125 | 125 | 125 |
| 125 | 125 | 125 | 125 | 125 |

*Fig. 8*

METHOD AND SYSTEM FOR CAPTURING IMAGES

CROSS-REFERENCE

The present application is a U.S. National Stage Application of International Application No. PCT/EP2021/083432, filed on Nov. 29, 2021 and published on Jun. 2, 2022 as WO 2022/112579 A1, which claims the benefit and priority of European Patent Application No. 20210504.5, filed on Nov. 29, 2020, and European Patent Application No. 21169258.7, filed on Apr. 19, 2021, each of which is incorporated herein by reference in its entirety for any purpose whatsoever.

FIELD OF THE DISCLOSURE

The present disclosure concerns a method and a system for capturing images, for instance for capturing still photography images or for capturing sequences of images, in particular for producing a video.

BACKGROUND

In recent years, active displays such as light-emitting diode (LED) displays have found a variety of applications ranging from computer displays or television screens in the office or household environment where typically a single display or two or three separate displays are used, to large-scale applications in the advertisement or entertainment industries where multiple LED panels are essentially seamlessly joined together to create LED rows or LED walls. In the context of the present application, reference will predominantly be made to LED displays as typical examples of active displays but it will be evident that the technology described herein can be used for other types of active displays as well, especially active pixel-based displays such as OLED- or plasma displays. Moreover, in the context of the present application, a row or column of LED-displays or LED-panels will refer to individual LED displays/panels joined together in one dimension (for instance, as a horizontal row or a vertical column), while LED wall refers to multiple LED panels joined together in two dimensions. Rather than showing the same image data/video content on each panel, suitable control equipment is usually used to distribute each image frame on the available number of LED panels so that the viewer gets the impression of a single display having huge dimensions. Moreover, in the context of the present disclosure, the term "video stream" is used to refer to any type of image content shown on the LED displays, for instance to actual video streams of different image frames shown in succession or to still images, even monochromatic still images. In this sense, "video stream" also comprises the case where a single still image is only presented once, i.e. without having to alter image content or re-sent image content to the LED display at a certain frame rate.

LED displays in the form of walls, rows or columns are widely used as billboards or signboards to convey information or advertisements to the viewers. Moreover, LED walls recently became increasingly popular in the entertainment industry for providing background and illumination in virtual studio settings.

In the analog age of film industry, complex backgrounds of a scenery have been provided by projecting the desired background scenery onto a screen and filming the actor in front of the screen. The resulting effect in the final video or film has been mediocre at best because, on the one hand, the image quality of the projected background was low and, on the other hand, the projected background could not provide realistic parallax effects when the camera is moved. Therefore, the audience could easily tell whether a given scene was filmed against an actual background or against a projected background in a studio setting. Studio filming became more versatile when so-called chromakeying technology was established where an actual foreground, for instance actors, were filmed against a monochromatic background. In post-production, the monochromatic background was identified and replaced by the desired background image using image processing technology. Although any color of a monochromatic background could be used in principle for chromakeying, colors which are not present in the human skin or in the human hair such as green and blue are usually employed so that this technology is commonly known as green screen or blue screen technology. Chromakeying offers a variety of benefits including the use of high-quality image data for background content replacement and even the possibility to account for camera movements during post-production. A major disadvantage of green screen or blue screen technology resides, however, in the fact that the actors have to act before a monochromatic background rather than before a real or even projected background so that they remain less immersed in the final scenery visible for the audience. Also, matching the chromakey over a larger area requires very precise lighting so the color is essentially identical over the whole background area without any gaps in between and without fading color values. Moreover, extensive post-production significantly adds to the overall costs of a project.

With LED displays, especially fine pitch displays, being available at increasing quality at reasonable costs, some studios have already switched to replacing the conventional green screen or blue screen with LED walls made up of a large number of panels. This allows the background scenery to be presented on the LED wall while filming the foreground together with the background, which significantly reduces the amount of video post-production. Accordingly, with modern LED display technology, it was possible to create a similar effect as in the analog past using projected background images but now using high-quality and bright LED displays instead. Nowadays, virtual studio sets even use ceilings equipped with LED Panel to create the overall lighting for the complete set. Consequently, the actor remains immersed in the actual background during filming but the digital background presented on the LED displays allow to take advantage of all possibilities of modern image processing technology so that the background shown on the LED displays can, for instance, take into account camera movement to create natural parallax effects within the area the camera is focused on in real-time.

In order to create a natural impression of video footage shot in such a virtual studio, the exact location and orientation/attitude of the camera with respect to the LED displays showing background imagery on the walls has to be known. To this effect, certain predetermined patterns, known as "tracking patterns", are mounted on panels at various locations in the studio and are either captured with the main camera, for example in a border region of an image which is later excluded from the final video in post-production, or by using auxiliary cameras attached to the main camera which can, for instance, capture tracking patterns attached to the ceiling of the studio where they would not interfere with the actual filming.

Although fine pitch LED panels provide a possibility to replace green screens or blue screens, the pixel-based nature of the background of a scenery is prone to generate moiré effects in the final video footage, especially in the area surrounding an actor in close-up (zoom) shots.

Related problems occur, when LED panels are used at live events, e.g. entertainment events or sports events, which are broadcast or recorded via video cameras and where LED panels are used as a virtual background or as advertisement signboards.

It has already been suggested to combine background scenery shown on LED displays with chromakey technology by identifying the field of view of the camera, normally represented by a so-called frustum (i.e. a portion of a cone or pyramid which lies between two parallel planes), where the smaller plane corresponds to the camera sensor or camera lens and the larger plane corresponds to the field of view of the camera on the LED display. Rather than showing actual background content on the LED displays corresponding to the field of view, a monochromatic image could be presented on the LED displays in this area thus allowing to replace the monochromatic image with high-quality image content using conventional chromakeying technology in video post-production. This allows to combine the immersion of virtual LED studios with high-quality images known from conventional chromakeying. The area outside of the frustum shows the colored background scene allowing for realistic reflections on all objects within the set.

As LED displays are not only used for background walls in a virtual studio but also became increasingly popular for ceilings and/or floors of a studio, for instance to provide background images as well but also to act as easily controllable lightning and illumination sources on the ceiling or to provide live information to the actors, for instance indications where to stand or to move on the floor. It has therefore also been suggested to provide additional information on ceiling or floor LEDs, such as tracking patterns for cameras or auxiliary cameras, which were conventionally provided on simple mechanical, i.e. non-digital, panels.

Videos in film studios are usually captured at a certain frame rate which depends on the country of the studio and the technology involved. For instance, movies for cinemas have long since been captured at a frame rate of 25 Hz, i.e. one image frame of a video is captured every 40 ms. With digital cameras, higher frame rates became more popular so that in Europe, many videos are captured at a frame rate of 50 Hz (corresponding to 20 ms per frame) or at 100 Hz (corresponding to 10 ms per frame) while in the US, frame rates of 60 Hz (corresponding to 16.67 ms per frame) or 120 Hz (corresponding to 8.33 ms per frame) are often employed. Depending on illumination conditions, the actual exposure time, usually denoted "shutter speed", to capture one image frame can be much shorter than the actual time period of the image frame as the inverse of the frame rate. Consequently, it has been suggested to present the additional image content relating to tracking patterns and chromakeys only during a short portion of each frame.

However, these attempts have led to noticeable flickering of the LED displays in the studio which is usually not accepted by the actors and other persons involved in the filming process in the studio.

The problem of identifying the position and orientation of a camera with respect to an LED display is also relevant in other applications, for instance in the field of so-called "virtual advertisement". At sports events, such as soccer matches, there are usually many LED displays installed in a stadium on which advertisement content is presented during the sports event. When videos of a sports event are broadcasted around the world, the specific advertisement content at the event will also be seen in the video. However, certain advertisements will only be relevant for audiences in certain locations and, more importantly, certain advertisements which are allowed in one country might even be prohibited by law in other countries. Virtual advertisement provides a solution to these problems by identifying the LED displays in the captured video and replace the actual content shown in the stadium by alternative content depending on the respective target audiences. To this effect, it is not only necessary to identify the location of the LED displays within the image, but also to identify the position and orientation of the camera with respect to the specific LED display. Therefore, similar problems as in video studios arise at sports events in the context of virtual advertisement as well, namely to allow identifying the location of the LED displays and the orientation of the camera without interfering with the viewing experience of persons actually present at the live event.

SUMMARY

It is therefore an object of the present disclosure to provide a method for capturing images, such as still photography images or sequences of images, in particular for producing a video of a scenery where physical active displays, such as LED displays, are present within or closely adjacent to the scenery, with the method allowing to present additional image content, in addition to a main image content, on the active displays without interfering with the filming of the video or with the viewing experience of the main image content by persons actually present within or close to the field scenery, such as actors, studio personnel, athletes or spectators present at a sports event.

This object is achieved by the method of the present disclosure as defined in present claim 1. Preferred embodiments of the method of the present disclosure are subject of the dependent claims.

Accordingly, the method for capturing images of a scenery comprises the steps of: providing a digital camera configured to capture images of said scenery; arranging one or more active displays within or adjacent to said scenery, said one or more active displays being configured to show image data at a high display frame rate (HDFR); presenting at least a first set of image data and a second set of image data in a time-sliced multiplexed manner, wherein at least said second set of image data comprises chromakey image data and/or tracking pattern image data; capturing images of said scenery with said digital camera, with said capturing of images of said digital camera being synchronized with the presentation of image data on said active display.

In the case of capturing images for still photography, the digital camera is preferably a still photography camera capturing only single images or short sequences of images which are processed as single images and are usually not used, for instance, as a sequence of images in a video (although it is noted that a sequence of images from a still photography camera can be combined to generate a video).

In another embodiment, the digital camera can also be a digital video camera where the sequence of captured images forms a video.

Nowadays, digital still photography cameras are usually also provided with a video-mode, i.e. they are capable of capturing videos as well while digital video cameras are often also capable of capturing still photographs, often even during shooting a video. Thus, while the distinctions between still photography cameras and video cameras are less prominent as far as digital cameras are concerned, those cameras still employ dedicated operation modes for still photography and video photography.

If a video is captured, the method of the disclosure comprises an initial step where a standard frame rate (SFR) for the finalized video is selected. The finalized video is the desired master video obtained after capturing the initial video and possible post production processes. Typical standard frame rates for the finalized master video are 25 Hz, 50 Hz, 60 Hz or 120 Hz. The inverse (1/SFR) represents the "duration" of each image frame in the finalized video. The finalized master video could be used as such; however, additional image processing tools are available, should it be desired to convert the finalized video to other standard frame rates. For instance, a video shot in Europe at a frame rate of 50 Hz can still be converted to a frame rate of 60 Hz video for a target audience in the U.S. Such conversion of the finalized video is not subject of the present application.

In the next step of the method of the present disclosure, a digital camera configured to capture images of said scenery at a recording frame rate (RFR) is provided. The recording frame rate can be the standard frame rate (SFR) of the final video or a higher frame rate. Generally, the recording frame rate (RFR) is an integer multiple of the standard frame rate (SFR) with the integer multiple for recording (nr) being preferably selected from 1, i.e. where RFR=SFR or any integer larger than 1 for which appropriate camera equipment is available, for instance nr can be selected from 2, 3, 4, 5, 6, 7, 8, 9 or 10.

In the next step, one or more physical active displays are arranged within or adjacent to the scenery. In the context of the present disclosure, "physical display" is a real object actually installed within or close to the scenery to be filmed. An active display such as an LED display can be arranged within this scenery if it is desired to capture the display itself in the video stream. This can, for instance, be desired if multiple LED displays form an LED wall and background scenery is presented on the LED wall. An arrangement of active displays adjacent to the scenery can be desired if active displays are used as lightning sources for illuminating the scenery and/or to provide additional information, for example for persons such as actors or for equipment such as auxiliary cameras. The active displays are usually configured to show image data at a high display frame rate (HDFR) which is higher than the standard frame rate (SFR), i.e. in general with in duration of one video image frame of standard frame rate (1/SFR), more than one display image is shown on the LED display. In one embodiment, the high display frame rate (HDFR) is an integer multiple for displaying (nd) of the standard frame rate (SFR) of the finalized video, with the integer multiple being larger than 1 (nd>1), e.g. an integer from 2 to 48, preferably from 2 to 24, for instance, 2, 4, 8, 16 or 24. This means that a standard frame of the final video of duration 1/SFR corresponds to nd slots of equal duration 1/HDFR, corresponding to 1/(nd·SFR), in which image data can be presented on the active display. However, more generally, the nd HDFR slots do not need to be of equal length. It is also possible to combine nd HDFR slots (nd>1) of variable length τ_i as long as the sum of the durations τ_i of the nd HDFR image slots corresponds the duration of the recorded standard video, i.e.

$$\sum_{i=1}^{nd} \tau_i = 1/SFR$$

In any case, the provision of active displays having a higher display frame rate than the standard frame rate of the final video allows to present additional image data on the LED displays, which do neither directly, as part of an active display visible in the final video, nor indirectly, through lighting effects, form part of the finalized video.

Accordingly, the method of the present disclosure suggests to present a first set of image data on the active display, said first set of image data consisting of first image frames having a duration of 1/HDFR, but which are presented at least at the standard frame rate (SFR). Consequently, said first image data are image data, which can appear in the finalized video either directly, i.e. if the respective active display is within the recorded scenery, or indirectly, i.e. if the active display is adjacent to the recorded scenery.

The method of the present disclosure further suggests presenting a second set of image data on the active display, with the second set of image data consisting of second image frames having a duration τ_i, for instance variable durations as described above or equal durations of 1/HDFR. The second set of image data typically consists of images, which, as will be described in more detail below, can, but not necessarily have to, appear in the finalized video.

According to the method of the present disclosure, images of the scenery are captured with the digital camera at the recording frame rate (RFR), with the capturing of the images of the digital camera being synchronized with the presentation of image data on said active display. The synchronization can be selected such that either of the first or second sets of image data is synchronized with capturing images by the digital camera, or, if the recording frame rate (RFR) is higher than the standard frame rate, that images are captured when first and second sets of image data are presented on the active display. In other embodiments, the camera can capture video frames which consist of image data on the physical display comprising more than one set of image data, for instance a combination of first and second sets of image data.

Finally, a video at a standard frame rate (SFR) is created from said images captured by said digital camera. The images are captured by the digital camera can already represent the final video, especially if the recording frame rate (RFR) already corresponds to the standard frame rate (SFR). In this case, a video image frame captured by the camera will typically comprise a combination of first and second sets of image data. Typically, even when operating at a recording frame rate (RFR) higher than the standard frame rate (SFR), modern video cameras often have a dedicated output for a standard frame rate video consisting of a combination of the frames captured at the higher recording frame rate (RFR). The digital camera can be synchronized to the presentation of the first set of image data. In this case, the captured video frame of the first set of image data can be repeated/stretched until it has a length of a standard frame rate (SFR) image. Usually, however, creation of the video will involve more or less significant video processing in postproduction.

In one embodiment, the recording frame rate (RFR) of the digital camera corresponds to the standard frame rate (SFR). In this embodiment, the digital camera will not capture all sets of image data shown on the active display. Rather, the image capturing step of the method of the present disclosure will include synchronizing the capturing of images of the digital camera with the presentation of either said first set of image data or said second set of image data on said active display.

On the one hand, the image capturing by the digital camera is typically synchronized with presentation of the first set of image data when the first set of image data shows images to be included either directly or indirectly in the final video, for instance if the active display shows background scenery to be recorded or if the active display, which in this case does not necessarily forms part of the scenery, provides suitable illumination for the scenery. This case, the second set of image data can provide information not required by the digital camera for capturing the video. Typical examples of such additional information are, for instance, tracking patterns which can be captured by an auxiliary camera attached to the main digital camera or text information or movement directives for the actors. As the image frames of the second set of image data are presented out of sync with capturing image frames of the first set of image data by the digital camera, the presentation of the second set of image data will not influence the final video at all.

It should be noted that the term "set of image data" is not limited to one type of image content. For instance, in the example mentioned above, the second set of image data can comprise both tracking patterns and text information for the actors. Both types of image content can be present in each individual image frame of the second set of image data or in different, for instance alternating, consecutive frames. Given that the standard frame rate SFR is usually chosen high enough that the human eye cannot differentiate between consecutive frames, the visual impression of different image content provided alternatingly in consecutive image frames essentially corresponds to the visual impression of the same content provided simultaneously within one image frame.

On the other hand, the image capturing by the digital camera is typically synchronized with presentation of the second set of image data when the second set of image data provides useful image content for your postproduction such as chromakey images or tracking patterns intended to be captured by the main camera. In this case, for instance in a studio environment, the first set of image data can still be used to provide background images or illumination to allow for improved immersion of the actors in the scenery and generate realistic reflections.

In many applications of the method of the present disclosure, it is desired that the presentation of the first set of image data on the physical display is not disturbed by the presentation of the second set of image data, for instance when the second set of image data comprises chromakey or tracking data. Even when the second set of image data is presented for such a short period of time that it cannot be consciously perceived by direct viewers present at or near the scenery, the direct viewers might still perceive a flickering of the consciously perceived first set of image data. Various methods can be applied to reduce disturbance of direct viewers by flickering.

For instance, in one embodiment of the method of the present disclosure, the second set of image data is presented at a lower frame rate than said recording frame rate. E.g., if the second set of image data comprises chromakey data or tracking data, it might be sufficient to include a second image data only every other recording frame of duration 1/RFR, for instance every 2 to 10 recording frames. Accordingly, the frame rate of the second set of image data would only be ½ to ¹⁄₁₀ of the recording frame rate (RFR). Thus, the influence of the second set of image data on the presentation of the first set of image data on the active display is considerably reduced.

A further improvement can be obtained if the effect of presentation of second image data on the perception of the direct viewers of the first image data can essentially be eliminated. To this effect, it is suggested to include a step of presenting a third set of image data on said physical active display, said third set of image data consisting of third image frames also having said duration $\tau\_i$ defined above, said the image data being formed as complementary/inverse images of said second set of image data. By presenting images of the second set of image data within a time delay too short to be resolved by the human eye, the combined effect of second and third image data results in a combined grey image which is still is too short to be consciously perceived by direct viewers but which will, if repeated alternately with the first set of image data, result in a perceived slight increase of the grey level of the first image data.

Preferably, the first and second and optionally third image data are presented in time-sliced, multiplexed manner where each image frame is presented for a duration of 1/HDFR on the physical active display.

In a preferred embodiment of the method of the present disclosure, the scenery is part of a digital video studio, i.e. the method is performed in a digital video studio where the active displays are part of the studio equipment forming, for instance, LED walls, LED ceilings and/or LED floors.

In another preferred embodiment of the method of the present disclosure, the scenery is part of a live event, for instance a sports event, i.e. the method is performed at the venue of the live or sports event where the active displays can, for instance, be used as LED surfaces or LED signboards, e.g. LED signboards on which advertisement is presented.

Irrespective of whether the method of the present disclosure is performed in studio or at the venue of a sports event, it is usually preferred that the first set of image data comprises video data presented in a manner that it can be perceived by the direct viewers of the active display, for instance by actors present in studio or by athletes or spectators present at the sports event. The second set of image data is usually not intended to be perceived by such direct viewers. As indicated above, this can be accomplished by including a third set of image data which essentially comprises complementary/inverse images of the images of the second set of image data sets of data that the combined images of second and third set of image data result in a grey image which itself is too short to be perceived by which raises the grey-level of the combined perception of first, second and third image data. This effect on the perception of the first set of image data can further be reduced if the ratio of frames of the first set of image data in a given time interval to the ratio of frames of the sum of frames of second and third image data in a given time interval is increased, i.e. if the first set of image data are presented for longer period of time that the second inserted image data within that time interval.

In one embodiment, the second set of image data comprises chromakey image data. The chromakey data can be presented as monochromatic images which cover the whole display area or the whole combined area of multiple display panels. However, if the field of view or frustum of the digital camera is known, it is also possible to reduce the area in which monochromatic image data are presented to the field of view or even to a part of the field of view so that interference with the presentation of images of the first set of image data is further reduced.

Alternatively or in addition to chromakey image data, the second set of image data can also comprise tracking pattern image data which can be used to extract information with respect to position and orientation of the digital camera using image processing technology known in the art. Tracking information can be derived from tracking patterns recorded by the main digital camera itself or by an auxiliary camera attached to the digital camera. Moreover, tracking information can be derived in real-time so that with additional information, for instance regarding camera lens and zoom level employed, the field of view or frustum of the digital camera can be calculated. It is therefore possible to adjust the images presented in the first set of image data are also in real-time so that correct parallax effects can be shown in the first set of image data within the frustum of the digital camera.

Moreover, if more than one camera is employed, for instance a second camera filming the same scenery from a different position and orientation, it would also be possible to include a further set of image data showing the same background as the first set of image data but, while the background of the first set of image data would be adapted to the orientation frustum of the first digital camera, the further set of image data would be adapted to the frustum of the second digital camera. Accordingly, the first digital camera would be synchronized to the first set of image data for background and to the second set of image data for chromakey and/or tracking pattern data, while the second digital camera would be synchronized to the further set of image data for background and to the second set of image data for chromakey and/or tracking pattern data.

Irrespective of whether are further digital camera is used or not, using a first set of image data for a first background and/or lightning data and a second set of image data for a second background and/or lightning data, it would be possible to capture one scene in one recording at completely different background and/or lightning conditions. For instance, the finalized video obtained from the first set of image data could show the scene at bright sunlight while the finalized video obtained from the further set of image data would show the same scene at dawn. Such an implementation of the method of the present disclosure increases, for instance, the options of a movie director in postproduction or of the client of a promotion video because more variants of the same scene are available without having to re-shoot the scene in the studio.

The chromakey image data and/or tracking pattern image data can be derived from the video images recorded by a camera at said recording frame rate (RFR) by combing suitable recorded images, for example by adding and/or subtracting certain video images from each other, as will be outlined in more detail below.

In the method of the present disclosure, the second set of image data is not limited to one set of chromakey image data or one set of tracking pattern image data. The "second set of image data" in the sense of the present disclosure could also include a combination of a chromakey and tracking pattern image data and/or more than one set of chromakey image data or tracking pattern image data. For instance, more than one chromakey can be employed to increase the quality of image replacement in postproduction if the objects filmed in front of the chromakey background already include colors used for the chromakey. Or, different tracking patterns optimized for wide angle and narrow angle or frustum settings, respectively, can be employed to increase tracking quality. A "second set of image data" in the sense of the present disclosure can also comprise black images, either as actual image data or as time intervals in which the LED display is essentially turned off. Especially when the HDFR display data are presented with variable length, very short time intervals can be used to briefly switch the display off before other sets of image data are presented.

When chromakey image data are employed, the chromakey image data are replaced with a fourth set of image data in the step of creating a video. Before set of image data can be high quality footage of a real background or, preferably, a high quality representation of an artificial environment created on a computer.

When tracking data are available, it is possible to precisely identify the frustum of the digital camera at any given moment. Consequently, it is also possible to overlay of fourth set of image data generated by a computer at any place within the frustum to generate video which corresponds to a combination of first set of image data and fourth set of image data. Consequently, it is not always necessary to use chromakey image data for image replacement by the fourth set of image data. However, if a certain background is rather monochromatic, for instance green grass of a soccer field, it is difficult to perform some degree of content replacement without having to resort to specific chromakey image data.

Due to the sequential presentation of chromakey data and tracking pattern data, there is usually a time delay between the image frame where chromakey data are replaced by the fourth set of image data and the image frame from which tracking data are derived. It is therefore suggested to interpolate the tracking information at time period of presentation of the chromakey data from the adjacent tracking pattern frames.

The present disclosure also concerns a system for producing a video of the scenery comprising one or more active displays within or adjacent to said scenery, one or more cameras synchronized with the active displays and a control system configured to perform the method of the present disclosure as described above.

Disclosure

BRIEF DESCRIPTION OF THE DRAWINGS

Various aspects of the present disclosure are discussed herein with reference to the accompanying Figures. It will be appreciated that for simplicity and clarity of illustration, elements shown in the drawings have not necessarily been drawn accurately or to scale. For example, the dimensions of some of the elements can be exaggerated relative to other elements for clarity or several physical components can be included in one functional block or element. Further, where considered appropriate, reference numerals can be repeated among the drawings to indicate corresponding or analogous elements. For purposes of clarity, however, not every component can be labeled in every drawing. The Figures are provided for the purposes of illustration and explanation and are not intended as a definition of the limits of the disclosure.

FIG. 8 shows one example of image data combination to obtain a tracking pattern according to the scheme of FIG. 7.

DETAILED DESCRIPTION

Figure 1:
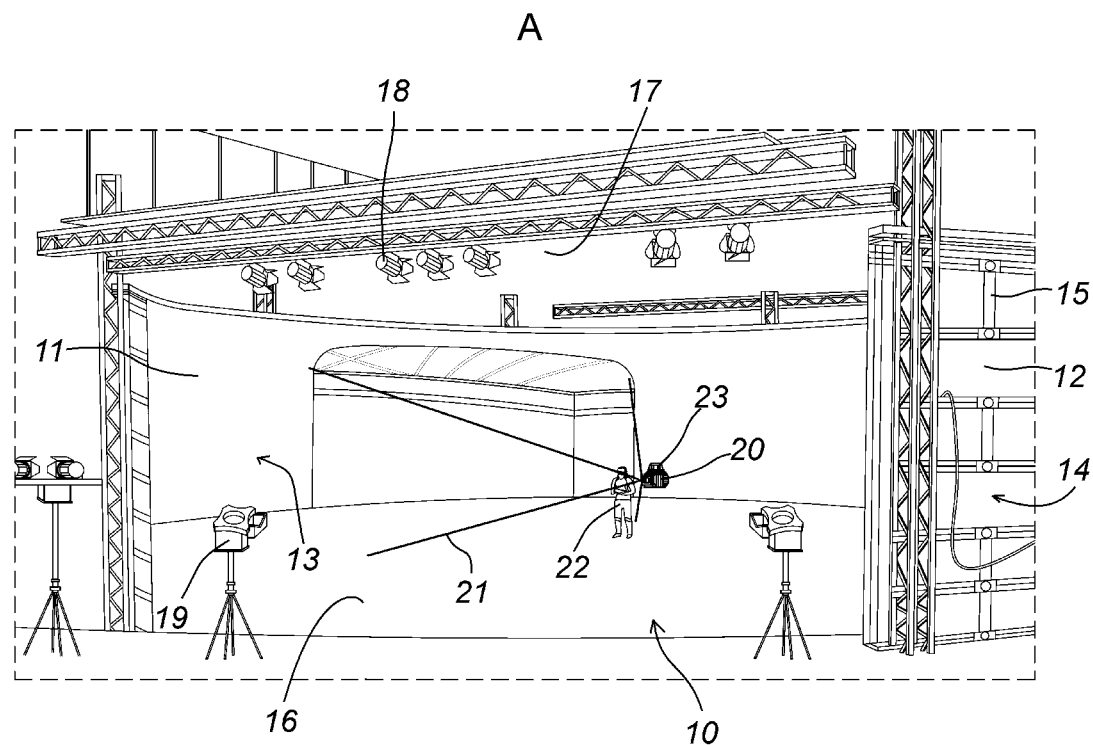
FIG. 1 is a schematic representation of a studio environment, where the method of the present disclosure can be practiced.

The subject technology overcomes many of the prior art problems associated with systems for capturing images. The advantages, and other features of the technology disclosed herein, will become more readily apparent to those having ordinary skill in the art from the following detailed description of certain exemplary embodiments taken in combination with the drawings and wherein like reference numerals identify similar structural elements. It should be noted that directional indications such as vertical, horizontal, upward, downward, right, left and the like, are used with respect to the figures and not meant in a limiting manner.

FIG. 1 shows a schematic representation of a digital video studio 10, which comprises an LED background wall 11, made from numerous individual LED panels 12. The LED wall 11 is an essentially seamless wall, when viewed from the front side 13, but, as can be seen from the partially visible backside 14 of wall 11, consists of individuals panels 12 fixed on suitable mounting structures 15. The studio 10 further includes an LED floor 16, also made from individual LED panels, as well as an LED ceiling 17, which is also made from individual LED panels. The studio 10 further includes conventional lighting equipment such as top lights 18 and floor lights 19, and one or more digital cameras schematically represented by a camera 20 in FIG. 1. FIG. 1 also denotes the field of view of camera 20 indicated by frustum 21. An actor 22 is shown in front of a camera 20 within the frustum of the camera's field of view. Attached to camera 22 is an auxiliary camera 23 directed in the example of FIG. 1 towards the LED sealing, where tracking patterns can be presented, which will be captured by auxiliary camera 23 attached to main camera 20, from which position and orientation of camera 20 can be derived.

Figure 2:
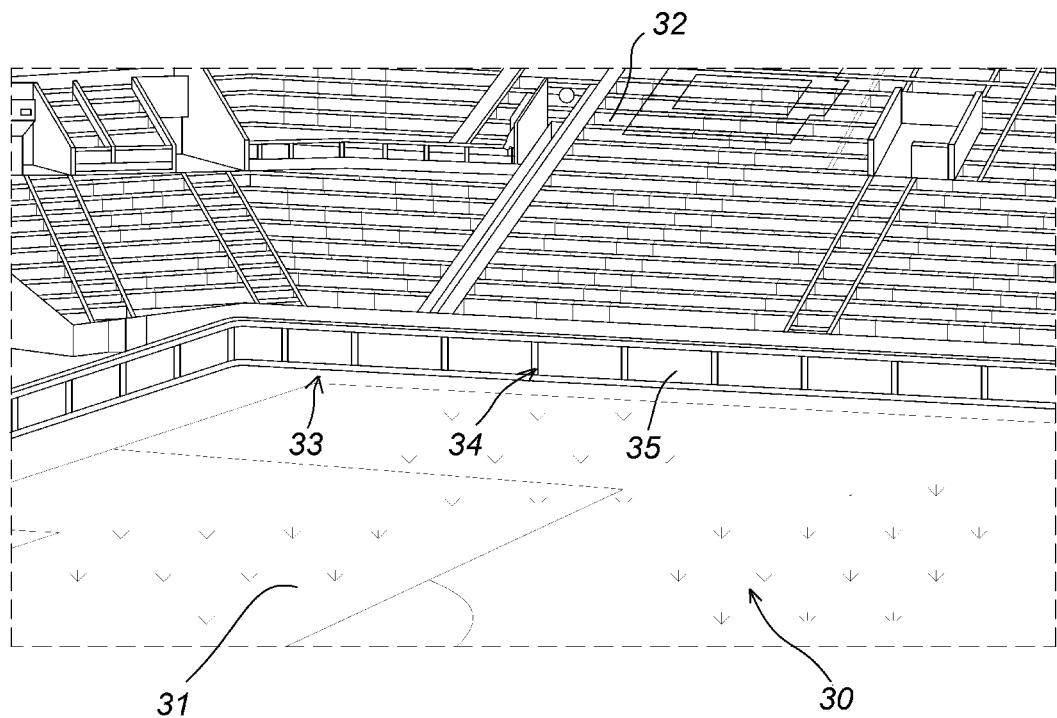
FIG. 2 is a schematic representation of a sports stadium, where the method of the present disclosure can be practiced.

FIG. 2 shows a sports stadium—in the case of FIG. 2 a soccer stadium 30—having a soccer field 31 and a stand structure 32 surrounding the soccer field 31. At the circumference 33 of soccer field 31, an LED row 34 consisting of individual LED panels 35 is provided to show advertisement. In a method of the present disclosure, advertisement to be viewed by the viewers present in the stadium can be presented as a first set of image data, while chromakey images can be presented as a second set of image data. In order to reduce disturbance of the live viewers present in the stadium, the present disclosure provides a third set of image data, which consists of image frames representing complementary/inversed images of the chromakey images of the second set of image data. In one embodiment, the first set of image data can also include tracking patterns, while the third set of image data can include complimentary images of said tracking patterns.

Figure 3:
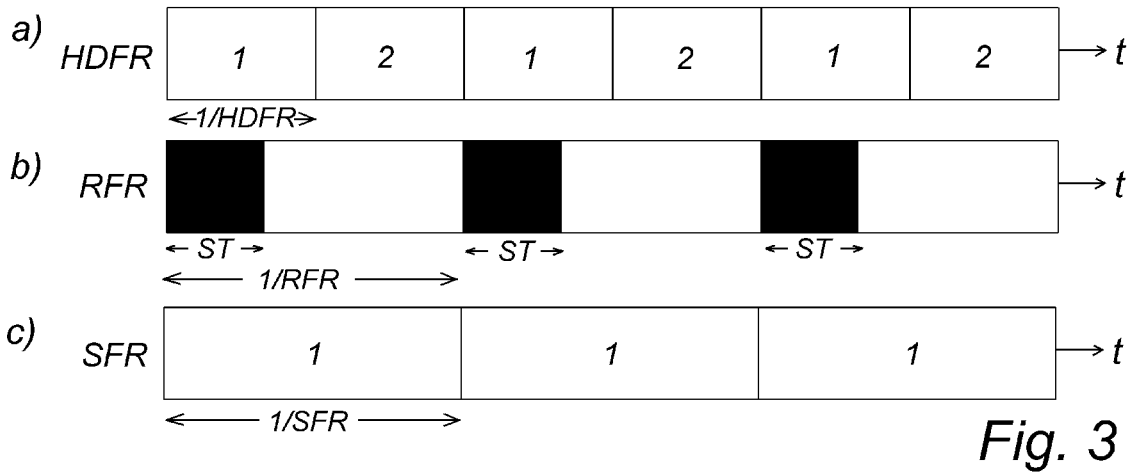
FIG. 3 is a schematic representation of a typical frame sequence, where the recording camera is synchronized to the first select image data.

FIG. 3 shows a simple embodiment of the method of the present disclosure where the high display frame rate HDFR is higher than the standard frame rate SFR an integer multiple of nd=2 which allows to present a first image data set 1 and a second image data set 2 during one period of a standard frame rate 1/SFR. For instance, at a standard frame rate SFR=50 Hz, the high display frame rate HDFR would correspond to 100 Hz and the time period 1/HDFR for each frame on the active display would correspond to 10 ms. In the example of FIG. 3, the recording frame rate RFR corresponds to the standard frame rate SFR, i.e. the recording integer multiple nr=1.

Row a) in FIG. 3 shows sequential image frames of image data presented on the active display, e.g. on a row or wall of LED panels. Each frame is presented for a time period of 1/HDFR. Frames of image data sets 1 and 2 are presented in a time-sliced multiplexed manner along time arrow "t". The numbers 1 and 2 in FIG. 3 should not be construed as necessarily referring to identical image frames but merely denote the sets of image data. E.g., if image data set 1 corresponds to a still image, frames denoted by "1" would be identical. However, if image data set 1 corresponds to a video, frames denoted by "1" would correspond to consecutive, usually different, images frames of said video.

Row b) represents the capturing of image data by the digital camera. As can be seen, the digital camera is synchronized to the presentation of frames of image data set 1 on the active display so that the resulting video content generated by the camera consist of the images of the first set of image data. As shown in row b), the shutter time ST of the digital camera should be equal to or shorter than the duration 1/HDFR for which one frame of first and second image data are presented on the active display. Accordingly, the recorded video indicated in the row c) of FIG. 3 will only contain image data which corresponding to image set 1 shown on the active display. This correspondence does not, however, mean that image frames denoted by "1" in rows a) and c) are identical. Rather, the image frames in row c) will usually show a scenery and, if the active display is part of that scenery, the active display while showing image frames of image data set 1. In this embodiment, image frames corresponding to image data set 2 are not recorded by the camera. Accordingly, such an embodiment could be employed if image data set 2 shows, for instance, tracking patterns which are not recorded by the main camera but by an auxiliary camera attached to the main camera. The auxiliary camera can be synchronized to the presentation of image frames of image data set 2 by the tracking patterns and can also be derived from an unsynchronized auxiliary camera using image processing technology.

It should be noted that the presentation scheme of image data in row a) of FIG. 3 (and likewise in the following FIGS. 4-6) does not necessarily mean that each set of image data is presented on the same LED panels. Rather, these schemes shall only describe the temporal relationship between the respective sets of image data and the synchronization of the digital camera. For instance a setting, where an auxiliary camera oriented to an LED ceiling is employed, it would be sufficient to present image data set 1 (i.e. background image data) on an LED wall while presenting image data set 2 on the LED ceiling only. The temporal relationship of the presentation of image data set 2 with respect to capturing image data set one by the digital camera would remain unchanged. The LED wall could, however, show image data set 1 even in frames where the LED ceiling shows image data set 2. Likewise, the LED ceiling could present image data set 2 only during the frames indicated by "2" in FIG. 3 and remained dark during the frames indicated by "1" in FIG. 3. However, it would also be possible to present appropriate lightning effects on the LED ceiling during the frames indicated by "1", i.e. lightning effects adapted to the images of the first set of image shown on the LED wall during the same time frames.

Figure 4:
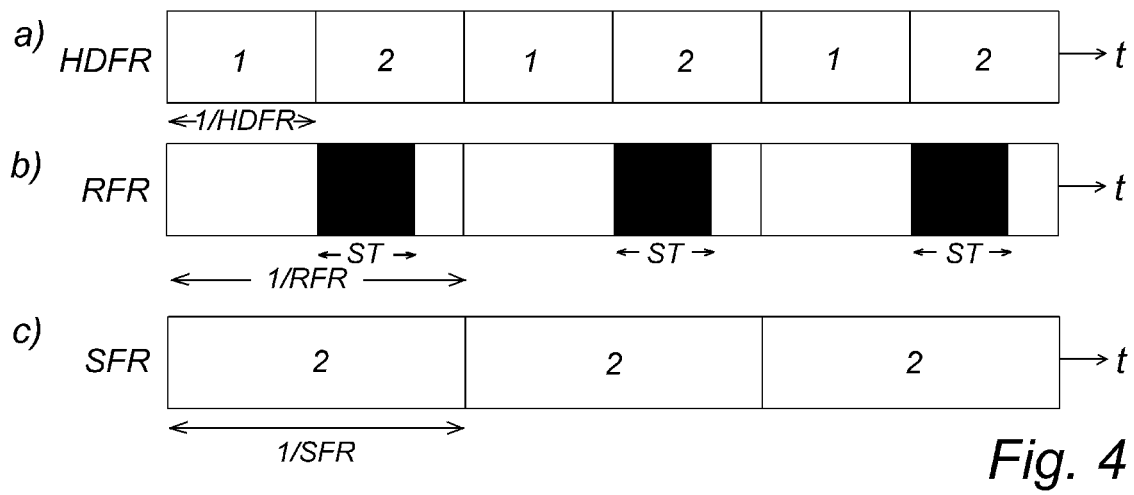
FIG. 4 is a frame sequence similar to the sequence of FIG. 3, where the recording camera is synchronized to presentation of the second set of image data.
Figure 5:
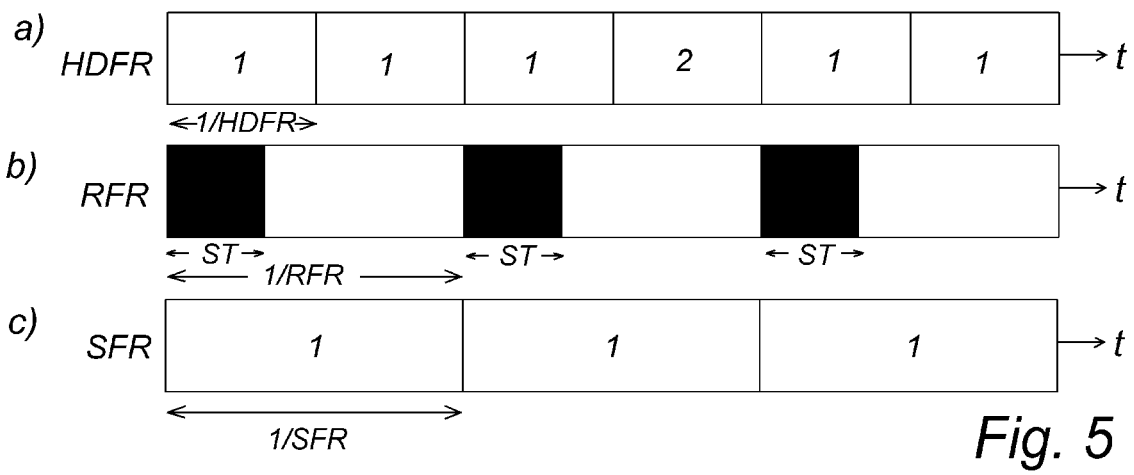
FIG. 5 is a frame sequence similar to the sequence of FIG. 3, the second set of image data is included at a lower rate.

FIG. 4 corresponds to FIG. 3 except that the digital camera is synchronized to the second image data 2 on the active display. This embodiment could, for instance, be employed if image data set 2 shows the chromakey data so that the video stream generated in row c) does not include background images intended, for instance, for actors but only the chromakey images for post-processing of the video. Accordingly, in post-processing, part of the scene corresponding to the selected chromakey could be replaced by alternative image content as known in the art.

However, the simple schemes presented in connection with FIG. 3 and FIG. 4 may still induce flickering in the perception of the persons present in the scenery.

FIG. is based on the scheme of FIG. 1 and shows a simple solution to reduce flickering of the perception of first image data on the active display by direct viewers: In this embodiment, the frame rate of second image data is only half of the standard frame rate. Depending on the purpose of image data set 2, even lower frame rates could be perceived.

Figure 6:
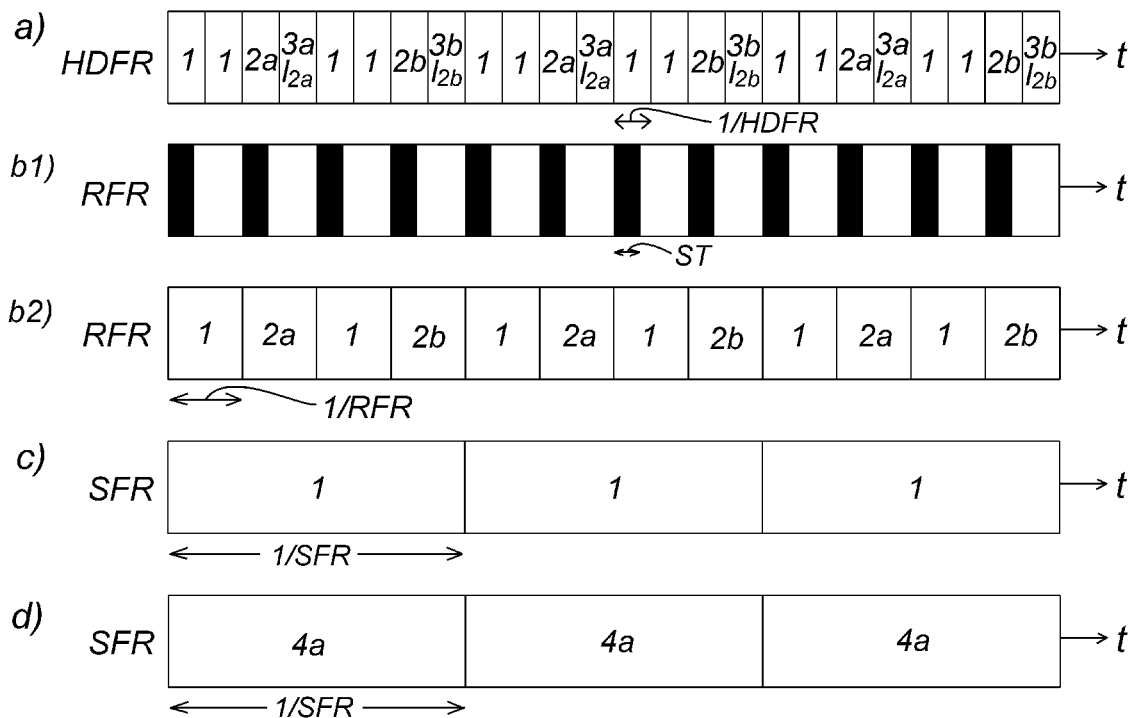
FIG. 6 is a frame sequence including a third set of images date comprising complementary/inverse images of the second set of image data.

FIG. 6 shows a more elaborate scheme of the method of the present disclosure. In the following, actual numbers a given in parentheses refer to an example where the standard frame rate is 50 Hz. Accordingly, in the example of FIG. 6, a high display frame rate is employed, which is eight times higher than the standard frame rate, i.e. nd=8 (with SFR=50 Hz, HDFR=400 Hz). Each image frame is presented for time period of 1/HDFR (2.5 ms) on the active display. In order to reduce flickering, additional image content presented on the active display in a time-sliced multiplexed manner includes not only image frames 2a, 2b of the second set of image data but also image frames 3a, 3b of a third set of image data. The image frames 3a, 3b are complementary/inverse images of the respective images 2a, 2b of the second set of image data (also denoted by "I2a" and "I2b" in FIG. 6) so that consecutive presentation of image frames 2a, 3a and 2b, 3b, respectively, result in a combined grey-level image which does not significantly affect the perception of image data set 1 by persons present in the scenery.

As shown in row b1), is scenery is recorded by a digital camera that a recording frame rate RFR=4×SFR, i.e. nr=4 (RFR=200 Hz, 1/RFR=5 ms). Again, the shutter speed ST of the camera should be rather than 1/HDFR (shorter than 2.5 ms). The camera is synchronized to the presentation of the first and second image data sets so that the raw video indicated in row b2) contains image data comprising the first and second sets of image data are presented on the active display. Accordingly, the raw video of row b2) requires further video processing in order to generate a finalized video ready for distribution.

Rows c) and d) of FIG. 6 shows two possibilities of the result of such postproduction:

In row c), a finalized video has been generated which contains only content of image data set 1, again referring to an active display included in a scenery. In a studio setting, this could be a video of an actor in front of an LED wall showing a desire background while image data set 2 is, for instance, used to present tracking patterns 2a, 2b which are employed in real-time analysis of the raw video b2) to track camera position and orientation, derived the camera frustum and adapt the image data set 1 presented on the LED wall accordingly. In a sports event setting, video c) would correspond to recording the "venue feed", i.e. the advertisements intended for the direct viewers in the stadium shown as image data set 1 on the LED panels of the signboard. Image frames 2a, 2b could include tracking and optional chromakey information as well.

In row d), a finalized video has been generated on the basis of frames 2a of image data set 2. Such an embodiment could be preferred if frames 2a comprise chromakey information which is then replaced by alternative content 4a. In a studio setting the alternative content can be an alternative background video and international sports event setting the alternative content could be an alternative advertisement shown on the signboard so that video d) could be of video of the sports event targeted to a different audience, for instance to an audience in a different country so that the alternative signboard advertisement can be adapted to the preferences of this audience.

Figure 7:
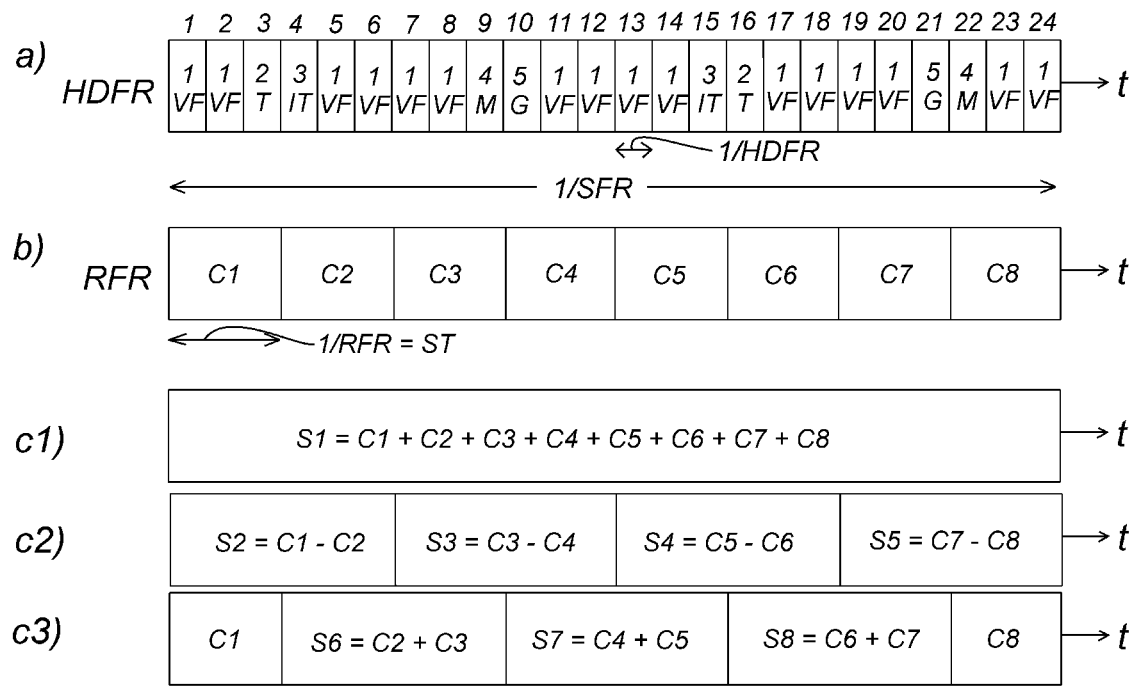
FIG. 7 is a frame sequence employing five sets of image data shown on the physical display.

FIG. 7 shows a further embodiment of the method of the present disclosure. In this embodiment, FIG. 7a) shows a frame sequence where during a time interval of a standard frame rate SFR (for instance, during 20 ms at SFR=50 Hz) 24 different image slots are presented on the physical display at a high display frame rate HDFR of 24×50 Hz=1200 Hz, i.e. each slot has a duration of 1/1200=0.83 ms (or 20 ms/24=0.83 ms). As can be taken therefrom, a first set of image data is presented to the direct viewers present at the event, denoted venue feed (VF) in FIG. 7 a). The first set of image data (VF) is presented in slots 1, 2, 5-8, 11-14, 17-20 and 23-24. The second set of image data comprises a tracking pattern (T) presented in slots 3 and 16, while the third set of image data comprises an inverse image of the tracking pattern (IT) presented in slots 4 and 15. The fourth set of image data comprises a chromakey, in this case magenta (M), presented in image slots 9 and 22, while the fifth set of image data comprises inverse images to the chromakey images, in this case green images (G) presented in image slots 10 and 21.

In FIG. 7b), the operation scheme of a camera operating at a frame rate of 8× of the standard frame rate SFR is shown (RFR=8×50 Hz=400 Hz). Consequently, each image C1-C8 captured by the camera during each 20 ms interval comprises three image slots shown on the physical display. In the present case, the shutter time ST corresponds to 1/RFR so that each of the 24 image slots is captured by the camera.

As can be taken from the scheme of FIG. 7a), persons present at the event will perceive the images associated with the venue feed (VF) during the longest part of each standard frame rate time interval, for instance in the case depicted in FIG. 7a), 13.3 ms of the 20 ms time interval so that the additionally presented tracking patterns and chromakey patterns are not consciously perceived by the human observer. Moreover, as tracking patterns and chromakey images are presented as pairs of image and respective inverse image, the already minimal effect on conscious perception is further reduced and flickering of the venue feed is also reduced.

As can be taken from FIGS. 7a) and b), each of the eight images captured by the digital camera during each standard frame rate time interval of 20 ms will not only include chromakey or tracking pattern information, but also images of the venue feed presented to the direct viewers.

Therefore, as indicated in FIGS. 7c1) to 7c3), the images recorded by the camera can be processed in various manners to obtain the desired image data, typically by obtaining sums or differences of various individual images. For instance, in FIG. 7c1), all images recorded during a video frame time interval (1/SFR) can be summed to a single video output image S1=C1+C2+C3+C4+C5+C6. The video output image will essentially correspond to the venue feed VF visible by the audience present at the event because any additional image data recorded is presented a pairs of images and inverse images and will therefore cancel. The only noticeable effect might result in a slight increase of the darkest black levels in the overall image. As a matter of course, a similar effect can be achieved using a camera with a shutter speed equal to 1/SFR). In the variant of FIG. 7c2), differences between subsequent images are calculated, i.e. S2=C1–C2 which results in a tracking patterned image and S3=C3–C4 which results in a chromakey image. Similarly, S4=C5–C6 results in a tracking patterned image and S5=C7–C8 results in a chromakey image. As shown in FIG. 7c3), more complex schemes can be envisioned. For instance, in order to obtain, only chromakey data in post-production, the images C2 and C3 (slots 4-9) can be added to obtain a sum image S6 and camera images C4 and C5 (slots 10-15) can be added to obtain a sum image S7. When subtracting the sum images S6 and S7 from each other, only the desired chromakey information will be obtained (chromakey=S6–S7). Likewise, camera images C6 and C7 can be combined to obtain a sum image S8 and tracking pattern information can be obtained by subtracting sum image S7 from sum images S8 (tracking pattern image=S8–S7).

The scheme presented in FIG. 7 can be used in a studio environment where the venue feed presents a video dedicated to the persons present in the studio while an artificial background is inserted in post-production using the chromakey and tracking data information. The scheme can also be employed at live events, where the physical display is only a small part of the scenery captured by the camera, for instance an advertisement signboard, and video post-production is employed to conduct image content replacement on those areas identified via chromakey image data using camera orientation information obtained by tracking pattern data. In any event, as tracking data and chromakey data are presented in different image slots, there will be an offset between the tracking information and the chromakey information which can be compensated in post-production. In other embodiments, a set of image data can be employed which features a combination of chromakey and tracking data information.

In FIG. 8, a LED display is schematically represented by a 5×11-matrix corresponding to a total of 55 LED pixels. In FIGS. 8a) and 8b), slots 1-3 and slots 4-6, respectively, of the scheme of FIG. 7a) are shown. As a representation of a venue feed (VF) image, each pixel is associated with a randomly selected 8-bit brightness level between 0 and 255. This random pattern is only an example representing an arbitrary venue feed. In reality, the venue feed would not consist of random intensities but represent an image frame of, e.g., a video present to direct viewers present at the event. As can be taken from FIG. 8a), this VF-image is presented in slots 1 and 2 of the scheme of FIG. 7a). In slot 3, a tracking pattern (T) is presented where LED pixels are either presented at a background intensity level or at an intensity level of the pattern itself. Maximum contrast is, for instance, obtained if the background is white (intensity level 255) and the actual pattern black (intensity level 0). However, this would result in large intensity fluctuations between slots 2 and 3, between slots 3 and 4 and between slots 4 and 5, which might give rise to a noticeable flickering of the physical LED display for persons present at the event. Therefore, preferably, the tracking pattern image (T) in slot 3 is presented at a mid-range intensity scale, for instance, as shown in FIG. 8a) using a background intensity of 190 and a pattern intensity of 128.

FIG. 8b) shows slots 4, 5 and 6 of the scheme of FIG. 7a) with slot 4 being the inverse tracking pattern image (IT) of the tracking pattern (T) of slot 3. Each LED pixel intensity is obtained by subtracting the corresponding pixel intensity of slot 3 from 255. Accordingly, the background in IT-slot 4 has an intensity value of 255–190=65 and the pattern has an intensity value of 255–128=127. Slots 5 and 6 correspond again to the random pattern representing the venue feed (VF) of slot 1.

FIGS. 8c) and 8d) show the resulting representations of the camera images captured by a video camera according to the scheme of FIG. 7b), i.e. camera images C1 combines LED display slots 1, 2 and 3 of FIG. 8a) and camera image C2 combines LED display slots 4, 5 and 6, respectively. The camera image frames C1 and C2 will depend on the dynamic range of the particular camera concerned. For instance, in FIG. 8c), the camera has also a dynamic range of 8 bit. Consequently, in order to avoid saturation of the CCD chip of the camera, the recorded brightness is the sum of the respective pixel intensities of slots 1, 2 and 3 divided by three and rounded to the next integer (C1=(VF+VF+T)/3 and C2=(IT+VF+VF)/3), respectively. In FIG. 8d), the video camera is, for instance, a 10-bit camera so that the recorded images can be added without the risk of separation, so that C1'=(VF+VF+T) and C2=(IT+VF+VF), respectively. Finally, FIGS. 8c) and 8d) also show the resulting pattern images obtained by subtracting camera image C2 from C1 and C2' from C1', respectively. In both cases, the tracking pattern is clearly visibly against the background and, in FIGS. 8c) and 8d) the respective pixels are outlined so that the overall pattern is better visible. For instance, in FIG. 8c) the tracking pattern is indicated by intensity values 0 and 1 over a background of intensity 41 or 42 (where changes in 1 bit result from rounding effects), while in FIG. 8d) the pattern is visible at an intensity level of 1 over a background intensity level 125 without any rounding effects.

It will be appreciated by those of ordinary skill in the pertinent art that the functions of several elements can, in alternative embodiments, be carried out by fewer elements, or a single element. Similarly, in some embodiments, any functional element can perform fewer, or different, operations than those described with respect to the illustrated embodiment. Also, functional elements shown as distinct for purposes of illustration can be incorporated within other functional elements in a particular embodiment.

While the subject technology has been described with respect to various embodiments, those skilled in the art will readily appreciate that various changes and/or modifications can be made to the subject technology without departing from the scope of the present disclosure.

REFERENCE SIGNS & ACRONYMS 10 digital video studio
11 LED background wall 11
12 LED panel
13 front side of LED wall
14 back side of LED wall
15 mounting structure for LED panel
16 LED floor
17 LED ceiling
18 top lights
19 floor lights
20 camera
21 viewing frustum
22 actor
23 auxiliary camera
30 soccer stadium
31 soccer field
32 stand
33 circumference of soccer field
34 LED row
35 LED panel SFR standard frame rate
RFR recording frame rate
HDFR high display frame rate
ST shutter time
t time
nd display frame rate integer multiple
nr recording frame rate integer multiple
VF venue feed
T tracking pattern
IT inverse tracking pattern
G green chromakey
M magenta chromakey

What is claimed is:

1. A method for producing videos of a scenery comprising the steps of:
   providing a digital video camera operating at a recording frame rate (RFR) configured to capture images of said scenery;
   selecting a standard frame rate (SFR) for finalized video, a high display frame rate (HDFR) comprising nd-HDFR slots, each having a duration $\tau_i$ with:

$$\sum_{i=1}^{nd} \tau_i = \frac{1}{SFR},$$

wherein nd is an integer larger than 1 (nd>1);
   arranging one or more active pixel-based displays within, and optionally adjacent to said scenery, said one or more active displays being configured to show image data at a high display frame rate (HDFR);
   presenting at least a first set of image data and a second set of image data on said active display in a time-sliced multiplexed manner, wherein at least said second set of image data comprises chromakey image data and/or tracking pattern image data, said tracking pattern image data being used for determining the exact location and orientation/attitude of said digital video camera with respect to said active pixel-based displays, said first and second sets of image data presented on said active display consisting of first and second image frames having a duration of Ti and are presented at least at said standard frame rate (SFR);
   capturing images of said scenery with said digital camera at said recording frame rate (RFR), with said capturing of images of said digital camera being synchronized with the presentation of either said first set of image data and/or said second set of i image data on said active display; and
   creating a video at said standard frame rate (SFR) from said images captured by said digital camera.

2. The method of claim 1, wherein the recording frame rate (RFR) of said digital camera corresponds to the standard frame rate (SFR).

3. The method of claim 1, wherein said second set of image data is presented at a frame rate lower than said recording frame rate (RFR).

4. The method of claim 1, wherein said method comprises the step of presenting a third set of image data on said active display, said third set of image data consisting of third image frames having said duration $\tau_i$, said the image data being formed as complementary/inverse images of said second set of image data.

5. The method of claim 4, wherein said first, second and third image data are presented in a time-sliced multiplexed manner.

6. The method of claim 1, wherein said scenery is part of a digital video studio.

7. The method of claim 6, wherein multiple of said active displays form an LED wall and/or an LED ceiling and/or an LED floor.

8. The method of claim 1, wherein said scenery is part of a live event.

9. The method of claim 8, wherein multiple of said active displays form an LED surface.

10. The method of claim 1, wherein said first set of image data comprises video data to be seen by direct viewers of the active display.

11. The method of claim 1, wherein said chromakey image data and/or tracking patterns are obtained by combining video images recorded at said recording frame rate (RFR).

12. The method of claim 1, wherein said step of creating a video comprises replacing said chromakey image data with a fourth set of image data.

13. The method of claim 12, wherein said step of creating a video comprises interpolating tracking pattern data to the capturing of chromakey data.

14. The method of claim 1, wherein said second set of image data comprises tracking pattern image data, said method comprising the step of recording said tracking pattern image data by an auxiliary camera attached to the digital video camera.

15. A method for producing videos of a scenery comprising the steps of:
   selecting a standard frame rate (SFR) for finalized video;
   arranging an active pixel-based display within said scenery, said active display configured to show image data at a high display frame rate (HDFR), said high display frame rate (HDFR) comprising nd HDFR slots, each having a duration $\tau_i$ with:

$$\sum_{i=1}^{nd} \tau_i = \frac{1}{SFR},$$

wherein nd is an integer larger than 1 (nd>1);
   presenting a first set of image data and a second set of image data on said active display in a time-sliced multiplexed manner, said second set of image data including chromakey image data and/or tracking pattern image data, said tracking pattern image data being used for determining the exact location and orientation/attitude of said digital video camera with respect to said active pixel-based display, said first and second sets of image data presented on said active display consisting of first and second image frames having a duration of Ti and are presented at least at said standard frame rate (SFR);
   capturing images of said scenery with said digital camera at said recording frame rate (RFR), and synchronizing the captured images with the presentation of either said first set of image data and/or said second set of image data on said active display; and
   creating a video at said standard frame rate (SFR) from said images captured by said digital camera.

16. The method of claim 15, wherein said method, comprises the step of presenting a third set of image data on said active display, said third set of image data consisting of third image frames having said duration $\tau_i$, said the image data being formed as complementary/inverse of said second set of image data.

17. The method of claim 15, wherein said first, second and third image data are presented in a tune-sliced multiplexed manner.

18. The method of claim 15, wherein said scenery is part of a digital video studio or event.

19. The method of claim 15, wherein said step of creating a video comprises interpolating tracking pattern data to the capturing of chromakey data.

20. The method of claim 15, wherein said step of creating a video comprises replacing said chromakey image data with a fourth set of image data.

* * * * *